(12) United States Patent
Park

(10) Patent No.: US 9,845,625 B2
(45) Date of Patent: *Dec. 19, 2017

(54) HINGE APPARATUS AND COMPUTING APPARATUS HAVING THE SAME

(71) Applicant: SAMSUNG ELECTRONICS CO., LTD., Suwon-si, Gyeonngi-do (KR)

(72) Inventor: Young-sun Park, Yongin (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/822,226

(22) Filed: Aug. 10, 2015

(65) Prior Publication Data

US 2015/0345195 A1    Dec. 3, 2015

Related U.S. Application Data

(63) Continuation of application No. 13/689,976, filed on Nov. 30, 2012, now Pat. No. 9,115,750.

(30) Foreign Application Priority Data

May 31, 2012   (KR) .................. 10-2012-0058306

(51) Int. Cl.
*E05D 3/12*   (2006.01)
*F16C 11/10*   (2006.01)
(Continued)

(52) U.S. Cl.
CPC ............. *E05D 3/122* (2013.01); *F16C 11/04* (2013.01); *F16C 11/10* (2013.01); *G06F 1/1637* (2013.01);
(Continued)

(58) Field of Classification Search
CPC ... E05D 3/122; E05D 11/0081; G06F 1/1681; G06F 1/1637; G06F 1/1683;
(Continued)

(56) References Cited

U.S. PATENT DOCUMENTS 3,092,870 A  *  6/1963  Baer .................... E05D 1/00
                                                        16/277
5,102,084 A     4/1992  Park
(Continued)

FOREIGN PATENT DOCUMENTS

CN          2797778       7/2006
CN        101277321      10/2008
(Continued)

OTHER PUBLICATIONS

International Search Report dated May 15, 2013 issued in International Application No. PCT/KR2013/000852.
(Continued)

*Primary Examiner* — William Miller
(74) *Attorney, Agent, or Firm* — Staas & Halsey LLP

(57) ABSTRACT

A hinge apparatus that connects a first member and a second member to each other so that the first member and the second member are mutually foldable. The hinge apparatus includes a first gear disposed on the first member to rotate according to a rotation of the first member and a second gear disposed on the second member and tooth-engaged with the first gear to rotate according to a rotation of the second member or a rotation of the first gear. The hinge apparatus also including a pressure member to reinforce a mesh force between the first and the second gears.

5 Claims, 15 Drawing Sheets

(51) Int. Cl.
*F16C 11/04* (2006.01)
*G06F 1/16* (2006.01)

(52) U.S. Cl.
CPC .......... *G06F 1/1681* (2013.01); *G06F 1/1683* (2013.01); *E05Y 2900/606* (2013.01); *Y10T 16/541* (2015.01); *Y10T 16/5402* (2015.01)

(58) Field of Classification Search
CPC ................ H04M 1/0216; H04M 1/022; E05Y 2900/606; F16C 11/10; F16C 11/04; Y10T 16/541; Y10T 16/53864; Y10T 16/5387; Y10T 16/540255; Y10T 16/5402; Y10T 16/547; Y10T 16/538; H05K 5/0226; H01R 35/02
USPC ......... 16/354, 302, 303, 330, 321, 366, 277; 361/679.27; 455/575.3; 379/433.13; 439/31, 165
See application file for complete search history.

(56) References Cited

U.S. PATENT DOCUMENTS

| | | | |
|---|---|---|---|
| 6,519,812 | B2 | 2/2003 | Ko et al. |
| 6,926,546 | B2 | 8/2005 | Kurokawa |
| 7,063,042 | B2 * | 6/2006 | Dillingham ............. E05D 3/122 16/354 |
| 7,140,074 | B2 | 11/2006 | Han et al. |
| 7,447,007 | B2 | 11/2008 | Jeun et al. |
| 7,765,644 | B2 | 8/2010 | Ueyama et al. |
| 7,832,056 | B2 | 11/2010 | Kuwajima et al. |
| 7,869,834 | B2 | 1/2011 | Seol et al. |
| 8,104,144 | B2 | 1/2012 | Wang et al. |
| 8,205,305 | B2 | 6/2012 | Wang et al. |
| 8,307,509 | B2 * | 11/2012 | Schau ..................... E05D 3/122 16/250 |
| 8,474,101 | B2 | 7/2013 | Wang et al. |
| 8,578,561 | B2 | 11/2013 | Chuang |
| 8,615,848 | B2 | 12/2013 | Mitsui |
| 8,959,719 | B2 | 2/2015 | Hsu |
| 8,978,206 | B2 | 3/2015 | Hsu et al. |
| 2002/0038493 | A1 | 4/2002 | Ko et al. |
| 2004/0266239 | A1 | 12/2004 | Kurokawa |
| 2005/0050686 | A1 | 3/2005 | Kurokawa |
| 2005/0155182 | A1 | 7/2005 | Han et al. |
| 2006/0071916 | A1 | 4/2006 | Jeun et al. |
| 2007/0054710 | A1 | 3/2007 | Pan |
| 2007/0226955 | A1 | 10/2007 | Cho et al. |
| 2007/0289099 | A1 | 12/2007 | Jung |
| 2008/0242359 | A1 | 10/2008 | Seol et al. |
| 2009/0013500 | A1 | 1/2009 | Ueyama et al. |
| 2009/0070961 | A1 | 3/2009 | Chung et al. |
| 2011/0085289 | A1 | 4/2011 | Park et al. |
| 2011/0157780 | A1 | 6/2011 | Wang et al. |
| 2011/0271486 | A1 | 11/2011 | Wang et al. |
| 2012/0042473 | A1 | 2/2012 | Wang et al. |
| 2012/0096678 | A1 | 4/2012 | Zhang et al. |
| 2013/0014346 | A1 | 1/2013 | Ahn et al. |
| 2013/0016492 | A1 * | 1/2013 | Wang ........................ E05D 3/18 361/820 |
| 2013/0135809 | A1 * | 5/2013 | Uchiyama ............. G06F 1/1681 361/679.09 |
| 2013/0139355 | A1 | 6/2013 | Lee et al. |
| 2014/0223693 | A1 | 8/2014 | Hsu |

FOREIGN PATENT DOCUMENTS

| | | |
|---|---|---|
| CN | 101907161 | 12/2010 |
| CN | 201874977 | 6/2011 |
| EP | 1707829 | 10/2006 |
| EP | 1838072 | 9/2007 |
| EP | 1 908 968 | 4/2008 |
| JP | 3083003 | 1/2002 |
| JP | 2006-64000 | 3/2006 |
| JP | 4023399 | 12/2007 |
| JP | 2008-144962 | 6/2008 |
| JP | 2012-037049 | 2/2012 |
| KR | 1020070103393 | 10/2007 |
| KR | 1020080067458 | 7/2008 |
| KR | 1020080107178 | 12/2008 |
| KR | 100909713 | 7/2009 |
| KR | 100949839 | 3/2010 |
| KR | 1020110039870 | 4/2011 |
| KR | 10-2011-0101631 | 9/2011 |
| WO | WO 2006/071068 | 7/2006 |
| WO | 2011/010779 | 1/2011 |

OTHER PUBLICATIONS

International Written Opinion dated May 15, 2013 issued in International Application No. PCT/KR2013/000852.
Extended European Search Report dated Sep. 3, 2013 in corresponding European Patent Application No. 13169217.0.
"Backlash", Wikipedia, Aug. 26, 2013 (Aug. 26, 2013), XP055076379, Retrieved from the Internet: URL: http://en.wikipedia.org/wiki/Backlash_(engineering) [retrieved on Aug. 26, 2013] *the whole document*.
Office Action dated Jan. 27, 2014 in copending U.S. Appl. No. 13/689,976.
Office Action dated Jun. 26, 2014 in copending U.S. Appl. No. 13/689,976.
Office Action dated Nov. 23, 2014 in copending U.S. Appl. No. 13/689,976.
Notice of Allowance dated Apr. 16, 2015 in copending U.S. Appl. No. 13/689,976.
U.S. Appl. No. 13/689,976, filed Nov. 30, 2012, Young-sun Park, Samsung Electronics Co., Ltd.
Taiwanese Office Action dated Jul. 18, 2016 in Taiwanese Patent Application No. 102107909.
Chinese Office Action dated Oct. 8, 2016 in Chinese Patent Application No. 201310189826.2.
Taiwanese Office Action dated Nov. 29, 2016 in Taiwanese Patent Application No. 102107909.
Chinese Office Action dated May 17, 2017 in Chinese Patent Application No. 201310189826.2.
Chinese Office Action dated Aug. 25, 2017 in Chinese Patent Application No. 20131018926.2.

* cited by examiner

HINGE APPARATUS AND COMPUTING APPARATUS HAVING THE SAME

CROSS-REFERENCE TO RELATED APPLICATIONS

This application is a continuation application of U.S. patent application Ser. No. 13/689,976 filed on Nov. 30, 2012 in the U.S. Patent and Trademark Office, the disclosure of which is incorporated herein in its entirety by reference, and claims the benefit of Korean Patent Application No. 10-2012-0058306, filed on May 31, 2012 in the Korean Intellectual Property Office, the disclosure of which is incorporated herein by reference in its entirety.

BACKGROUND

1. Field

Methods and apparatuses consistent with exemplary embodiments relate to a hinge apparatus and a computing apparatus having the same, and more particularly, to a hinge apparatus which connects two members to each other using a hinge so that the two members are foldable from oo to 360°, and a computing apparatus having the same.

2. Description of the Related Art

In a laptop personal computer (PC), a computing unit, which includes a printed circuit board (PCB) and a keypad, and a display unit are generally connected to each other by a hinge so that the computing unit and the display unit are mutually foldable. Therefore, if such a laptop PC is used, the display unit which is connected to the computing unit by the hinge (in this case, an angle between the computing unit and the display unit is 0°) is rotated at a desired angle according to a user's position (for instance, is rotated about the computing unit at about 90° to about 120°).

As described above, a related-art hinge apparatus includes a single rotary shaft and generally limits the angle between the computing unit and the display unit to oo to 180°.

A hinge apparatus having two rotary shafts to rotate the computing unit and the display unit greater than 180° has been developed. Such a hinge apparatus includes two shafts which are connected to the computing unit and the display unit, respectively, and two gears which are connected to the shafts, respectively, and are tooth-engaged with each other. However, the hinge apparatus employing such gears has a gap between the gears due to various factors such as a manufacture tolerance of the gear and a tolerance between the gears and the gear shafts, and thus causes a back lash phenomenon.

Therefore, if a user uses the laptop PC while riding in a car, the display unit may move in a rotation direction due to an external shock or vibration exerted to the laptop PC. Thus, there is a problem that user's eyes easily get tired when the user uses the laptop PC while seeing the moving display unit.

SUMMARY

One or more exemplary embodiments provide a hinge apparatus which can prevent a back lash phenomenon caused by a gap between gears of first and second bodies connected to each other to be mutually foldable, and, if the first and the second bodies are rotated at a predetermined angle, can maintain the first and the second bodies at the predetermined angle without moving the first and the second bodies, and a computing apparatus having the same.

One or more exemplary embodiments also provide a hinge apparatus which includes an electric connecting means having improved durability, and a computing apparatus having the same.

One or more exemplary embodiments also provide a hinge apparatus which can rotate first and second bodies, which are connected to each other to be mutually foldable, at 360° regardless of a thicknesses of the first and the second bodies, and a computing apparatus having the same.

One or more exemplary embodiments also provide a hinge apparatus which can be configured as a compact apparatus, and a computing apparatus having the same.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a hinge apparatus which connects a first member and a second member to each other so that the first and the second member are mutually foldable, the hinge apparatus including: first and second main gears which are disposed on the first and the second members, respectively, a plurality of idle gears which are disposed between the first and the second main gears so that the first and the second main gears are interlocked with each other, and a pressure member which reinforces mesh force between the first and the second main gears and the plurality of idle gears.

The pressure member may press the plurality of idle gears in opposite directions toward each other.

The plurality of idle gears may include a first idle gear which is tooth-engaged with the first main gear and a second idle gear which is tooth-engaged with the second main gear. The pressure member may be disposed on a first rotary shaft and a second rotary shaft with which the first and the second idle gears are connected, respectively. The pressure member may press the first and the second rotary shafts in opposite directions toward each other.

The pressure member may be made of an elastic material. The pressure member may have opposite ends slidably connected with the first and the second rotary shafts, respectively. The pressure member may be a S-shaped plate spring.

The hinge apparatus may further include a fixing means which, if the first and the second members are set at any one of angles from oo to 360°, maintains the first and the second members at the set angle.

The fixing means may press the first and the second main gears in an axial direction of each main gear so as to restrict rotation of the first and the second main gears.

The fixing means may include: a push member which is in contact with one sides of the first and the second main gears, and an elastic member which is disposed on first and second driving shaft of the first and the second main gears to elastically support the push member toward the first and the second main gears. The elastic member may include a plurality of spring washers.

The fixing means may further include a cam structure which is disposed between the push member and the first and the second main gears to fix the first and the second members at a pre-set angle.

The cam structure may include: a plurality of first cam members which are disposed on the first and the second main gears, respectively, and a plurality of second cam members which are detachably connected to the plurality of first cam members. The plurality of first cam members may be rotated and the plurality of second cam member may be fixed.

The foregoing and/or other features and utilities of the present general inventive concept may also be achieved by providing a hinge apparatus which connects a first member and a second member to each other so that the first member and the second member are mutually foldable, the hinge apparatus including: a first gear which is disposed on the first member, a second gear which is disposed on the second member and is tooth-engaged with the first gear, and a pressure member which reinforces mesh force between the first and the second gears.

The foregoing and/or other features and utilities of the present general inventive concept may also be achieved by providing a foldable computing apparatus including: a first body which has a computing function, a second body which is electrically connected to the first body and has a display function, and at least one hinge unit which connects the first and the second bodies to each other so that the first and the second bodies are mutually foldable, wherein the hinge unit includes: first and second main gears which are disposed on the first and the second bodies, respectively, a plurality of idle gears which are disposed between the first and the second main gears so that the first and the second main gears are interlocked with each other, and a pressure member which presses the plurality of idle gears in opposite directions toward each other and reinforces mesh force between the first and the second main gears and the plurality of idle gears.

The foregoing and/or other features and utilities of the present general inventive concept may also be achieved by providing a foldable computing apparatus including: a first body which has a computing function, a second body which is electrically connected to the first body and has a display function, and at least one hinge unit which connects the first and the second bodies to each other so that the first and the second bodies are mutually foldable, wherein the hinge unit includes: a first gear which is disposed on the first body, a second gear which is disposed on the second body and is tooth-engaged with the first gear, and a pressure member which reinforces mesh force between the first and the second gears.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
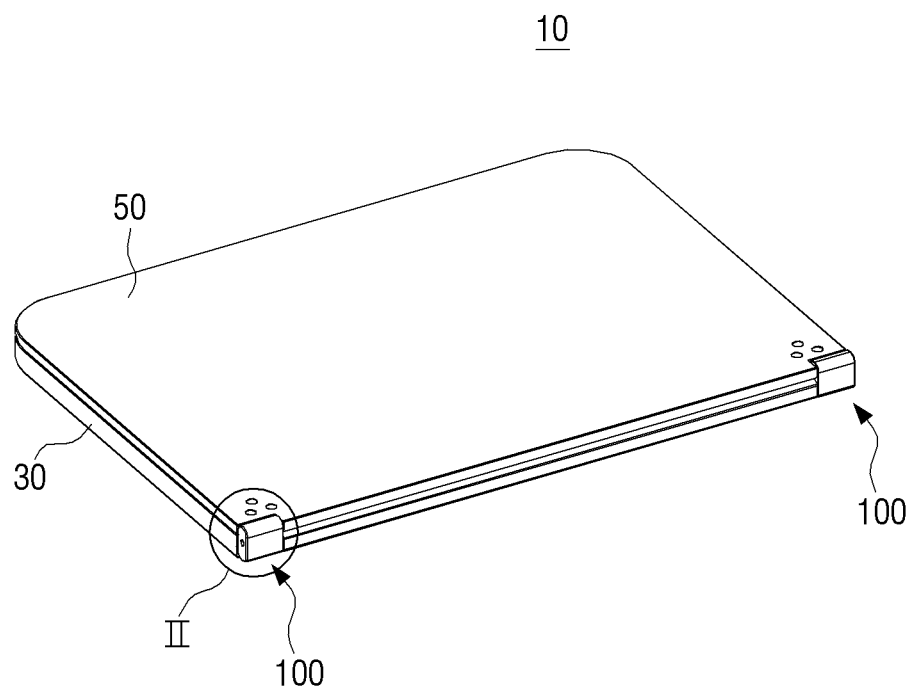
FIG. 1 is a perspective view illustrating a hinge apparatus usable with a computer apparatus according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

Hereinafter, a hinge apparatus according to exemplary embodiments of the present general inventive concept will be explained with reference to the accompanying drawings.

Referring to FIG. 1, a hinge apparatus 100 usable with a computing apparatus 10 according to an exemplary embodiment connects a first body 30, which is of a flat type and has a computing function of the computing apparatus 10, for example, a mobile device or a laptop personal computer (PC), and a second body 50 which is of a flat type and has a display function, to each other so that the first and the second bodies 30 and 50 are mutually rotatable and foldable.

The first body 30 has one or more functional units to perform functions of the computing apparatus 10, for example, a printed circuit board (PCB not illustrated) in which a calculating apparatus such as a central processing unit (CPU) is mounted and various electronic parts (not illustrated) embedded therein, and is provided with a keypad (not illustrated) on an external portion thereof. The second body 50 is provided with a display panel, is electrically connected to the first body 30, and is controlled by the first body 30. The second body 50 may display an image associated with the function of the first body 30. The second body may also have one or more functional units (not illustrated) to perform one or more functions of the second body. The second body 50 may display an image associated with the function of the first body 30 or the second body 50. Either the first body 30 or the second body 50 may have a network interface to communicate with an external device to transmit and receive data associated with the functional of the first body 30 and/or the second body 50. When the display panel of the second body 50 is a capacitive or resistive touch panel, the second body 50 may be controlled by a touch or access input, for example, a capacitance signal or a pressure signal directly input to the display panel.

Although the hinge apparatus 100 is applied to the laptop PC in the present exemplary embodiment, the hinge apparatus 100 may be used to connect a tablet computer apparatus (for example, a tablet PC) having a touch panel and an independent keypad to each other.

Figure 2:
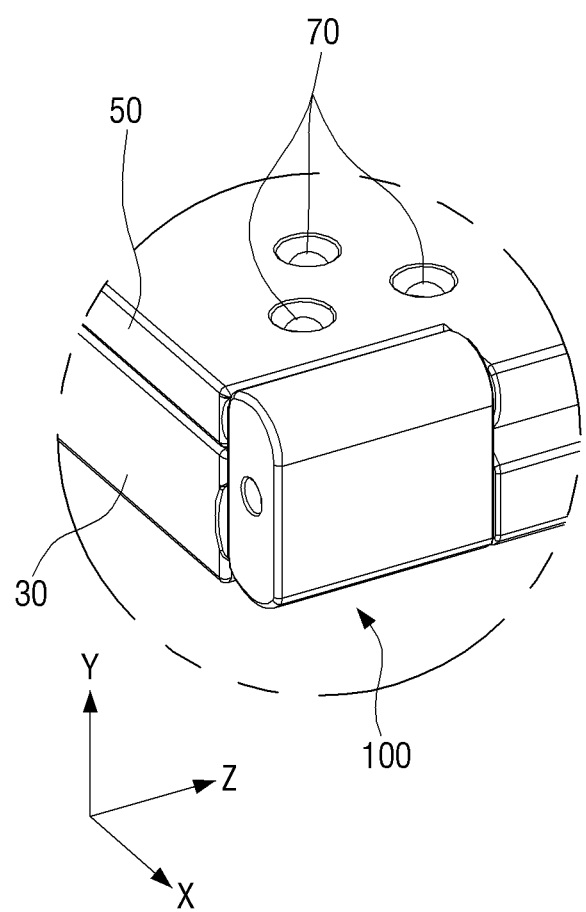
FIG. 2 is an enlarged view illustrating a portion II of FIG. 1.

Referring to FIG. 2, a plurality of securing holes 70 are formed on each of the first and the second bodies 30 and 50 to fix the first and the second bodies 30 and 50 to connection brackets 131 and 132 (see FIG. 4) of the hinge apparatus 100. When the computing apparatus 10 is disposed on a reference plane relating to an X direction in a folding state, the second body 50 may rotate with respect to the first body 30 about a Z direction or the hinge apparatus 100.

Figure 3:
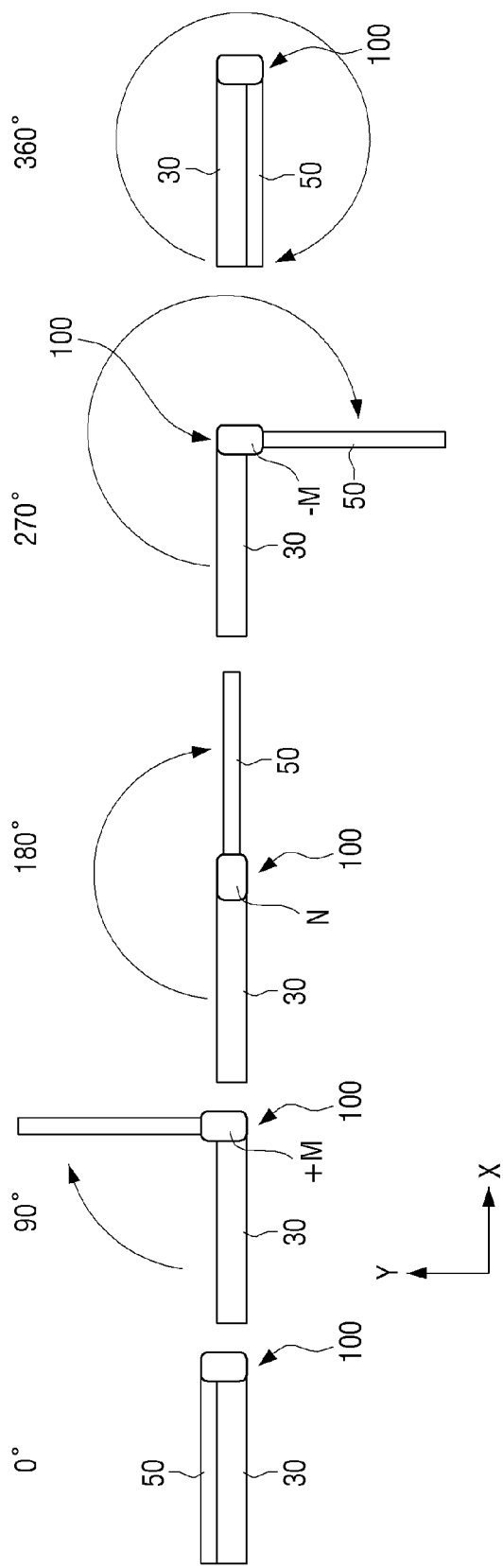
FIG. 3 is a schematic view illustrating a process of rotating first and second bodies of the computer apparatus of FIG. 1 from oo to 360° in sequence to fold the first and the second bodies one over the other.

Referring to FIG. 3, a thickness of the first body 30 is greater than a thickness of the second body 50. The hinge apparatus 100 according to the exemplary embodiment allows the first and the second bodies 30 and 50 having different thicknesses to be rotated at any one of angles from oo to 360°, and also allows the first and the second bodies 30 and 50 to be folded one over the other at the angle of oo and 360°. However, the present general inventive concept is not limited thereto. It is possible that the first and the second bodies 30 and 50 have the same thickness. In this case, the hinge apparatus 100 may allow the first and the second bodies 30 and 50 to be rotated and folded within the above angles.

The hinge apparatus 100 may change a position according to an angle formed by the first and second bodies 30 and 50. For example, the hinge apparatus 10 may be in an M position in a folding state of the first and second bodies 30 and 50, maintain the M (that is, M+) position when the second body 50 is parallel to the Y direction, be changed to an N position in a 180° state, and then changed to the M (that is, −M) position, with respect to the X-Y axes.

Hereinafter, the hinge apparatus 100 according to the exemplary embodiment will be explained in detail with reference to FIGS. 4 to 13.

Figure 4:
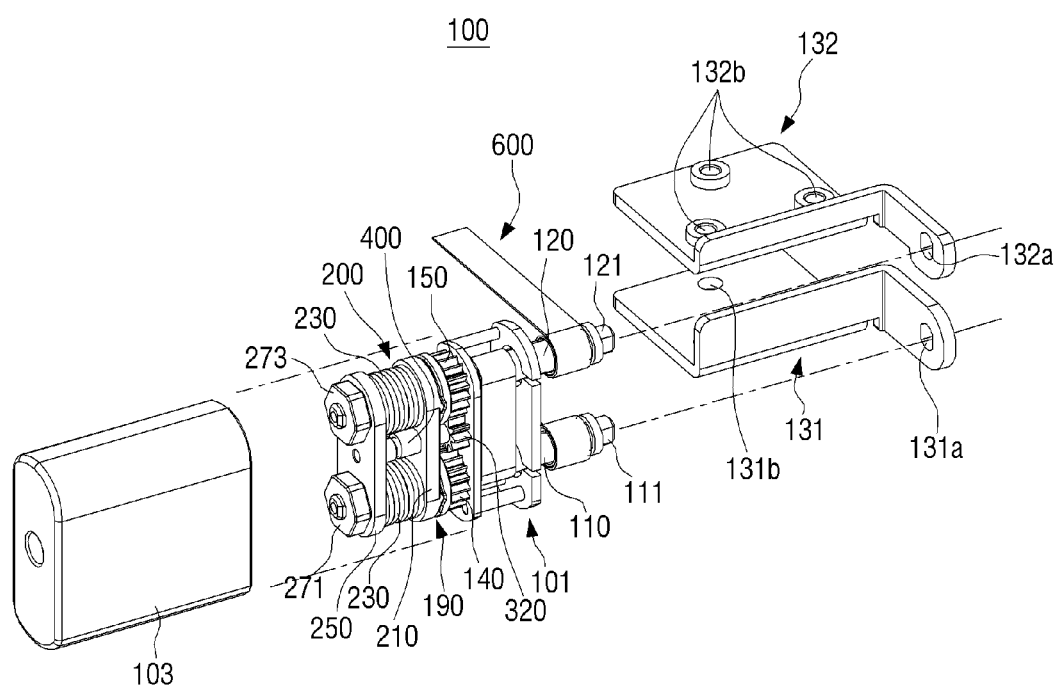
FIG. 4 is an exploded perspective view illustrating a portion of the hinge apparatus of FIG. 1.
Figure 5:
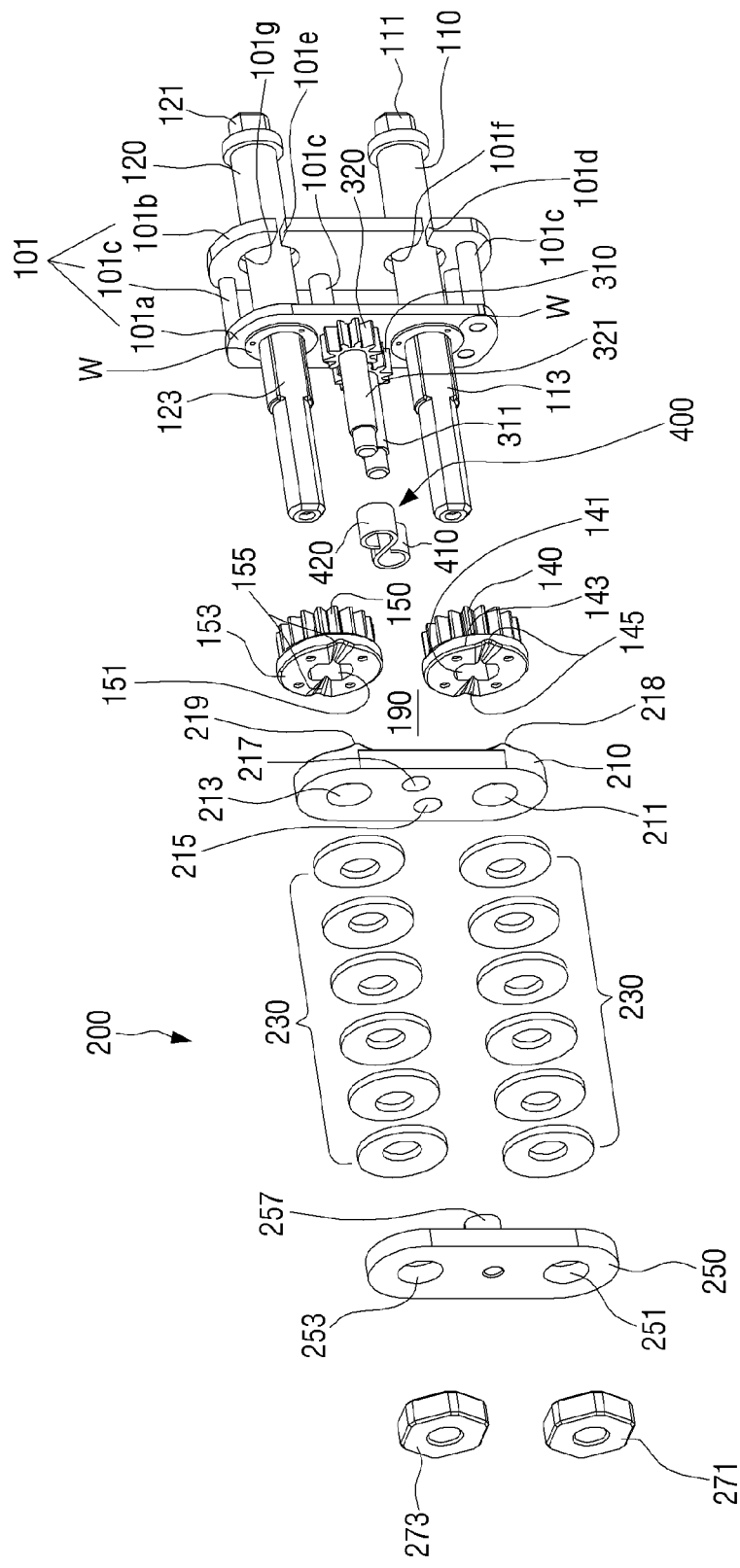
FIG. 5 is an exploded perspective view illustrating the hinge apparatus of FIG. 4.

Referring to FIGS. 4 and 5, the hinge apparatus 100 includes a base frame 101, a protection cap 103, first and second mains gears 140 and 150, a fixing unit 200, first and second idle gears 310 and 320, a pressure member 400, a cam structure (cam unit) 190 to maintain the first and second bodies 30 and 50 folded at a pre-set angle (for example, oo or 360°) and/or to rotate the first and second bodies 30 and 50 at an angle with respect to each other, and an electric connecting unit 600 to electrically connect the first body 30 and the second body 50.

The base frame 101 includes first and second support elements 101a and 101b to rotatably support first and second driving shafts 110 and 120. The first and the second support elements 101a and 101b are disposed to be spaced-apart from each other by one or more spacers 101c. The one or more spacers 101c may be disposed parallel with each other to maintain a predetermined gap there between and/or to maintain a distance between the first and the second support elements 101a and 101b. The second support element 101b has a pair of cutaway portions 101d formed on one side thereof to allow portions (603 and 606 in FIG. 12) of the electric connecting unit 600 to pass there through. The pair of cutaway portions 101d and 101e extend to penetrating holes 101f and 101g into which the first and the second driving shafts 110 and 120 are respectively inserted, so that the portions 603 and 606 of the electric connecting unit 600 can be inserted into the penetrating holes 101f and 101g through the pair of cutaway portions 101d and 101e. Accordingly, the electric connecting unit 600 can be easily mounted around the first and the second driving shafts 110 and 120.

The protection cap 103 covers the first and the second mains gears 140 and 150, the fixing unit 200, the first and the second idle gears 310 and 320, the pressure member 400, the cam structure 190, and the electric connecting unit 600, in addition to the base frame 101. The protection cap 103 can prevent the above units from being exposed to an outside thereof and can protect the above from an external shock or foreign material.

The first and the second driving shafts 110 and 120 are placed in parallel with each other and have one ends 111 and 121 fixed to the first and the second connection brackets 131 and 132 through connection holes 131a and 132a. The first and the second connection brackets 131 and 132 are connected to portions of the first and the second bodies 30 and 50, respectively, using a plurality of securing unit (not illustrated). In this case, securing elements to define a plurality of securing holes 70, 131b, and 132b are formed on portions where the first and the second connection brackets 131 and 132 are connected to the first and the second bodies 30 and 50, and are connected with the plurality of securing unit (not illustrated).

As described above, the first and the second driving shafts 110 and 120 are connected to the first and the second bodies 30 and 50 through the first and the second connections brackets 131 and 132, so that the first and the second driving shafts 110 and 120 drive the first and the second main gears 140 and 150 in association with the rotation of the first and the second bodies 30 and 50.

Referring to FIG. 5, the first and the second main gears 140 and 150 have insertion holes 141 and 151 formed therein to be connected with connection portions 113 and 123 of the first and the second driving shafts 110 and 120 and thus allow the first and the second main gears 140 and 150 to be rotated when the first and the second driving shafts 110 and 120 are rotated according to a movement of at least one of the first body 30 and the second body 50 with respect to each other.

The first and the second main gears 140 and 150 are pressed or biased by the fixing unit 200 with a predetermined pressure so that the first and the second main gears 140 and 150 are movably attached or biased to one surface of the first support element 101a of the base frame 101. Such a pressure may restrict the rotation of the first and the second main gears 140 and 150, and thus the first and the second driving shafts 110 and 120 may not be smoothly rotated but may be restricted in rotation or rotated with a restriction pressure. As described above, since the rotation of the first and the second driving shafts 110 and 120 is restricted, if the first and the second bodies 30 and 50 are set at any one of angles from oo to 360°, the set angle can be maintained.

The fixing unit 200 includes a push member 210 which is in contact with one sides of the first and the second main gears 140 and 150, an elastic member 230 which elastically presses the push member 210 toward the first and the second main gears 140 and 150, and a holding member 250 which supports the elastic member 230.

The push member 210 includes a pair of first penetrating holes 211 and 213 through which the first and the second driving shafts 110 and 120 penetrate, and a pair of second penetrating holes 215 and 217 which are formed between the pair of first penetrating holes 211 and 213 and through which first and second rotary shafts 311 and 321 connected with the first and the second idle gears 310 and 320 penetrate. If the first and the second driving shafts 110 and 120 and the first and the second rotary shafts 311 and 321 penetrate through the push member 210, the push member 210 is disposed to be slidable along the first and the second driving shafts 110 and 120.

The elastic member 230 is disposed between the push member 210 and the holding member 250 to provide a bias force thereto or press the push member 210 from the holding member 250 toward the base frame 101 in an axial direction of the first and the second driving shafts 110 and 120. The elastic member 230 may include one or more spring washers so that the elastic member 230 is helpful in making the hinge apparatus 100 compact and also prevents the pressure on the push member 210 from being reduced. Such spring washers may occupy a smaller space than a coil spring having the same volume and have a greater elastic force. The first and the second driving shafts 110 and 120 are inserted into the plurality of spring washers and the spring washers are placed to face opposite surfaces alternately.

The holding member 250 includes a pair of penetrating holes 251 and 253 through which the first and the second driving shafts 110 and 120 penetrate, and includes a pair of bosses 257 and 258 (see FIG. 6) protruding from the holding member 250 to allow ends of the first and the second rotary shafts 311 and 321 to be rotatably inserted thereinto.

In this case, the ends of the first and the second driving shafts 140 and 150 passing through the pair of penetrating holes 251 and 253 of the holding member 250 are connected with elastic adjustment nuts 271 and 273. Accordingly, the holding member 250 may support the elastic member 230 so that the push member 210 is pressed toward the first and the second main gears 140 and 150.

The elastic force of the elastic member 230 may be adjusted according to a degree of screwing the first and second driving shafts 110 and 120 with the pair of elastic adjustment nuts 271 and 273 or according to a coupling state between the first and second driving shafts 110 and 120 and the corresponding elastic adjustment nuts 271 and 273. For example, if the elastic adjustment nuts 271 and 273 are rotated in a screwing direction, the holing member 250 is moved to the elastic member 230 by a predetermined distance so that a gap between the holding member 250 and the first and the second main gears 140 and 150 becomes narrow and thus the elastic force of the elastic member 230 increases. On the other hand, if the elastic adjustment nuts 271 and 273 are rotated in an unscrewing direction, the elastic force of the elastic member 230 is reduced. Accordingly, states of the first and the second bodies 30 and 50 to be fixed, maintained, or held in a certain position or angle may be appropriately adjusted by adjusting the pair of elastic adjustment nuts 271 and 273 with respect to the first and second driving shafts 110 and 120.

Figure 6:
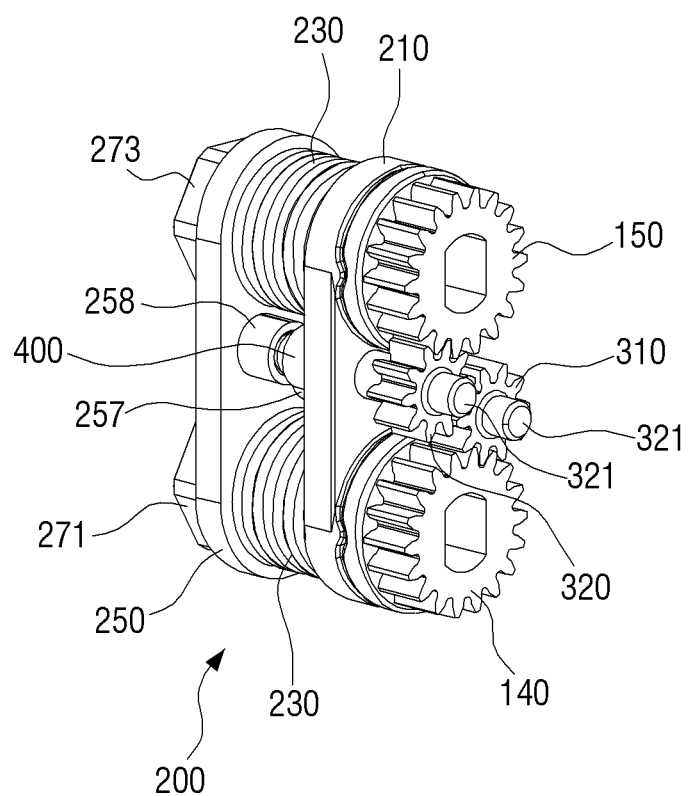
FIG. 6 is a perspective view illustrating an arrangement between first and second main gears and first and second idle gears in the hinge apparatus of FIG. 4.

Referring to FIG. 6, the first and the second idle gears 310 and 320 are disposed between the first and the second main gears 140 and 150, and are tooth-engaged with each other with the first and the second rotary shafts 311 and 321 being connected thereto. The first idle gear 310 is tooth-engaged with the first main gear 140 and the second idle gear 320 is tooth-engaged with the second main gear 150.

As described above, the first and the second idle gears 310 and 320 may be disposed between the first and the second main gears 140 and 150 so that rotation centers (rotation axis) of the first and the second main gears 140 and 150 can be changed. In this case, the rotation centers of the first and the second main gears 140 and 150 are the same as those of the first and the second bodies 30 and 50, respectively. Accordingly, even if the thicknesses of the first and the second bodies 30 and 50 are different from each other, the center of rotation can be changed as much as a distance corresponding to the difference in thickness and thus the first and the second bodies 30 and 40 are rotatable at the angle of 360°.

The first and the second rotary shafts 311 and 321 penetrate through the push member 210 and have their respective ends rotatably supported by the bosses 257 and 258 of the holding member 250. In this case, portions of the first and the second rotary shafts 311 and 321 are placed between the push member 210 and the holding member 250, and the pressure member 400 is disposed on the portions of the first and the second rotary shafts 311 and 321.

Figure 7:
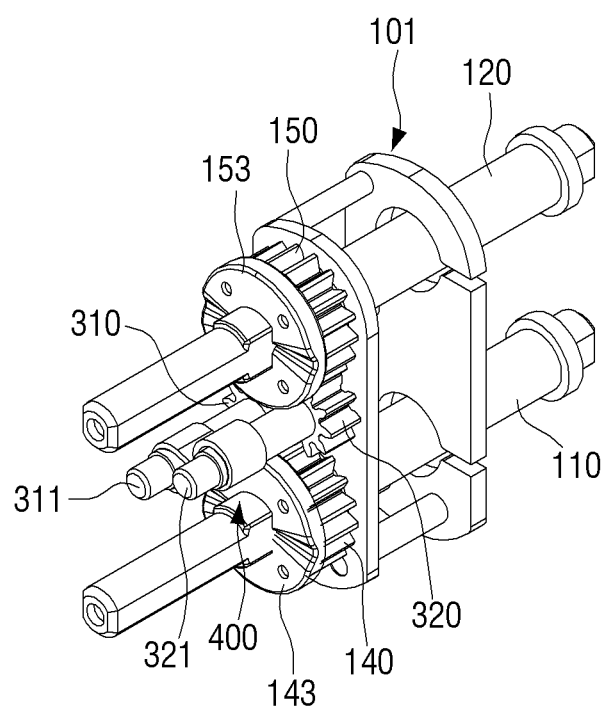
FIG. 7 is a perspective view illustrating a cam structure to realize a locking function in a state in which an angle between the first and the second bodies is oo and 360° in the hinge apparatus of FIG. 4.
Figure 8:
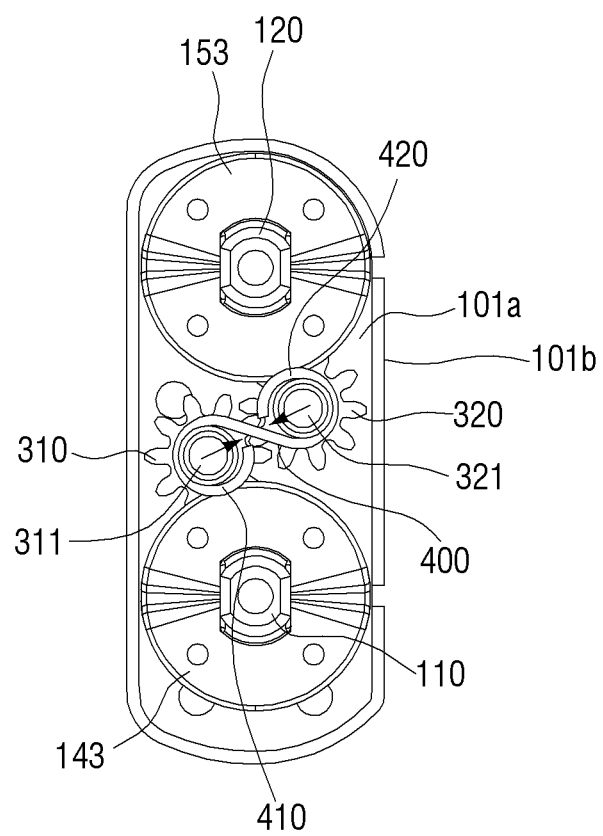
FIG. 8 is a perspective view illustrating a pressure member to provide a force to a corresponding rotary shaft of the first and the second idle gears in the hinge apparatus of FIG. 4.

Referring to FIGS. 7 and 8, the pressure member 400 is disposed on the first and the second rotary shafts 311 and 321 and presses the first and the second rotary shafts 311 and 321 in opposite directions toward each other.

Due to the pressure of the pressure member 400, the first and the second idle gears 310 and 320 respectively connected with the first and the second rotary shafts 311 and 321 are pressed or biased in opposite directions toward each other (in arrow directions in FIG. 8) or in adjoining directions, so that a mesh force between the corresponding gears increases. In addition, the pressure of the pressure member 400 increases a mesh force between the first main gear 140 and the first idle gear 310 and a mesh force between the second main gear 150 and the second idle gear 320.

Figure 9:
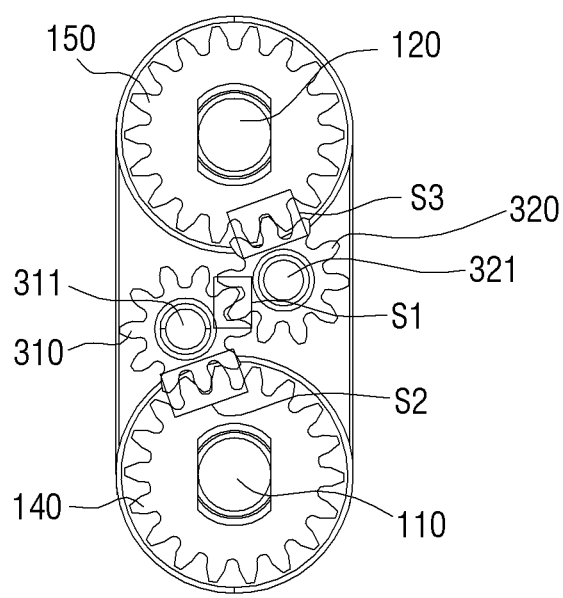
FIG. 9 is a side view illustrating an arrangement of the first and second main gears and the first and second idle gears of FIG. 6.

Accordingly, the mesh force increases at portions 81, 82, and 83 where the corresponding gears are tooth-engaged with one another, as illustrated in FIG. 9. The increased mesh force can prevent a back lash phenomenon caused by a gap between gears due to various factors such as a manufacture tolerance of gears or a tolerance between gears and gear shafts. Accordingly, if the first and the second bodies 30 and 50 are rotated at a predetermined angle, a relative movement of the first and second driving shafts 110 and 120 or the first and second main gears 140 and 150 by an external shock or vibration can be prevented.

Any pressure member 400 can be applied that can press the first and the second rotary shafts 311 and 321 in opposite directions toward each other. In the present exemplary embodiment, the pressure member 400 is an S-shaped plate spring.

As described above, opposite ends of the pressure member 400 are slidably connected with the corresponding first and second rotary shafts 311 and 321. The pressure member 400 made of an elastic material can increase the mesh force of the tooth-engaged portions (81, 82, and 83) among the corresponding gears without interfering or preventing the rotation of the first and the second rotary shafts 311 and 321.

Figure 10:
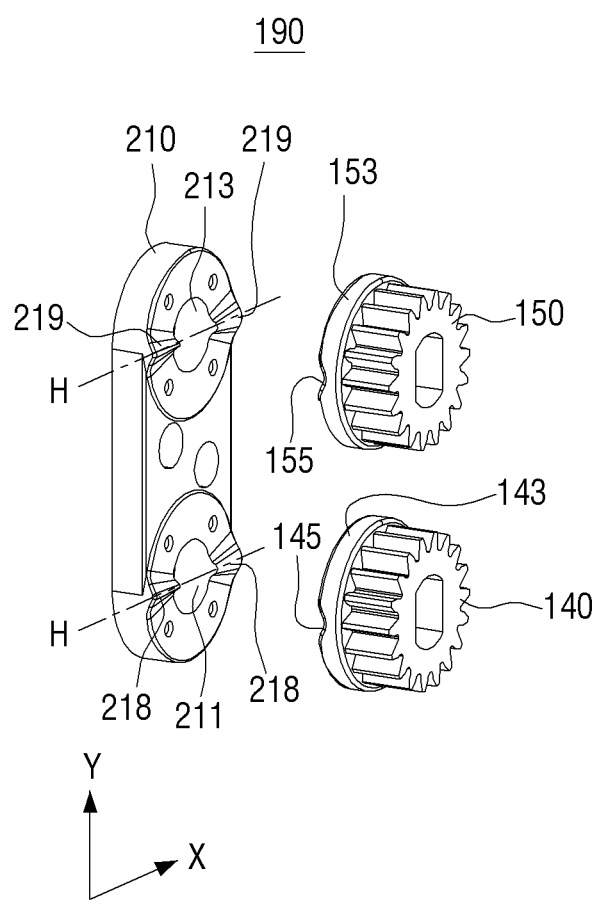
FIG. 10 is a schematic view illustrating a cam structure with a tooth-engagement configuration between gears in the hinge apparatus of FIG. 4.

Referring to FIG. 10, the cam structure 190 is to lock the first and the second bodies 30 and 50 at a pre-set angle (for example, 00 or 360°) and maintain the first and the second bodies 30 and 50 in a folded state, and is disposed between the first and the second main gears 140 and 150 and the push member 210.

The cam structure 190 includes a plurality of first cam members 143 and 153 disposed on the first and the second main gears 140 and 150, respectively, and a plurality of second cam members 218 and 219 disposed on the other surface of the push member 210.

Each of the first cam members 143 and 153 includes a pair of substantially triangular connection recesses 145 and 155 (see FIG. 5) symmetrically formed with reference to the corresponding insertion holes 141 and 151. The connection recesses 145 and 155 may have a substantially triangular recess shape. The first cam members 143 and 153 may also include first plane portions disposed between the connection recesses 145 and 155. The second cam members 218 and 219 may have protrusions to protrude in a protrusion shape to correspond to a recess shape of the connection recesses 145 and 155 to be convex-concave connected to the connection recesses 145 and 155. The second cam members 218 and 219 may also have second plane portions disposed between the protrusions.

A dimension of the protrusion shape of the second cam members 218 and 219 may vary according to a radial direction of the first penetrating holes 211 and 213. A dimension of the protrusion shape of the second cam members 218 and 219 may vary according to a distance from the corresponding first penetrating holes 211 and 213 in a radial direction of the first penetrating holes 211 and 213. A dimension of the protrusion shape of the second cam members 218 and 219 may have a height at a center area lower than a circumference area of the second cam members 218 and 219.

A dimension of the recess shape of the connection recesses 145 and 155 of the first cam members 143 and 153 may vary according to a radial direction of the insertion holes 141 and 151. A dimension of the recess shape of the connection recesses 145 and 155 may vary according to a distance from the corresponding insertion holes 141 and 151 in a radial direction of the insertion holes 141 and 151. A dimension of the recess shape of the connection recesses 145 and 155 may have a depth at a circumference area greater than a center area of the first cam members 145 and 155.

According to a relative rotation of the first and second bodies 30 and 50, at least one of the first and second driving shafts 110 and 120 rotates such that the first and second main gears 140 and 150 rotates relatively with respect to each other, and thus the first cam members 143 and 153 rotates with respect to the corresponding second cam members 218 and 219. Therefore, the connection recesses 145 and 155 of the first cam members 143 and 153 may move with respect to the corresponding second cam members 218 and 219 between a first portion where the connection recesses 145 and 155 are disposed in a direction, for example, an H direction, to correspond to the protrusions of the second cam members 218 and 219 disposed in a direction, for example, an H direction, and a second position where the connection recesses 145 and 155 are disposed on the second plane portions of the second cam members 218 and 219 and where the protrusions of the second cam members 219 are disposed on the first plane portions of the first cam members 143 and 153.

When the protrusions of the second cam members 218 and 219 and the connection recesses 145 and 155 of the second cam members 218 and 219 are in the first position, a moving (rotation) force may be required to move from the first position to the second position. That is, a moving force may be applied to the first and second bodies 30 and 50 such that the protrusions of the second cam members 218 and 219 can move from the connection recesses 145 and 155 to the first plane portions of the first cam members 143 and 153 and/or such that the connection recesses 145 and 155 can move from the protrusions to the second plane portions of the second cam members 218 and 219. The moving force may be greater than at least one of a friction of a contact between the first cam members 143 and 153 and the second cam members 218 and 219 and a pressure force of the fixing unit 200.

Also according to a rotation of the first and second bodies 30 and 50, the first plane portions of the first cam members 143 and 1153 moves with respect to the protrusions of the second cam members 218 and 219 or the second plane portions of the second cam members 218 and 219 moves with respect to the connection recesses 145 and 155 of the first cam members 143 and 153. In this case, a pressure or bias force may be applied to the second cam members 218 and 219 and the first cam members 143 and 153 such that a certain angle or position of the first and second bodies 30 and 50 can be maintain.

When the first and second bodies 30 and 50 move to a position to form 180° and to other positions other than 180°, the hinge apparatus 100 moves between an initial position A to an intermediate position B with respect to the first body 30, as illustrated in FIG. 3, at least due to a coupling force between the protrusions of the second cam members 218 and 219 and the connection recesses 145 and 155 of the first cam members 143 and 153, a pressure force of the fixing unit 200, and/or a friction force of contact surfaces between the first cam members 143 and 153 and the second cam members 218 and 219.

The first cam members 143 and 153 are connected to one surface of the first and the second main gears 140 and 150 to be rotated along with the first and the second main gears 140 and 150, and the second cam members 218 and 219 are fixed to one surface of the push member 210. In this case, since the protrusions of the second cam members 218 and 219 are disposed in a direction H, for example, a horizontal line, as illustrated in FIG. 10, if the first and the second bodies 30 and 50 are folded one over the other at oo or 360°, the protrusions of the second cam members 218 and 219 are connected to the connection recesses 145 and 155 of the first cam members 143 and 153 so that the folded state can be stably maintained at the angel of oo or 360°.

The protrusions of the second cam members 218 and 219 may be formed at an angle rather than the horizontal line H. For instance, the protrusions of the second cam members 219 and 219 may be formed at an angle corresponding to an angle between the first and the second bodies 30 and 50, which is appropriate for use of the computing apparatus, for example, a laptop PC 10. Accordingly, the first and the second bodies 30 and 50 may be locked at various angles according to the exemplary embodiment of the present general inventive concept.

The second cam member 218 or 219 may have one or more protrusions disposed on the horizontal line H with respect to the penetrating hole 213 or 214. These two protrusions disposed on the horizontal line H may be different from each other to lock the first and second bodies 30 and 50 in a state of 180° or a state of oo and 360°. A difference between the two protrusions may be determined according to forces to maintain the first and second bodies 30 and 50 of the computing apparatus 10 in a state of 00 and 360°, a transitional force around a state of 180°, or forces to move the first and second bodies 30 and 50 of the computing apparatus 10 to a state between 00 and 180° or a state between 180° and 360°. The two protrusions may have dimensions to be determined according to a preference or design options. The connection recesses 145 and 155 may have dimensions to correspond to the dimensions of the protrusions.

Figure 11:
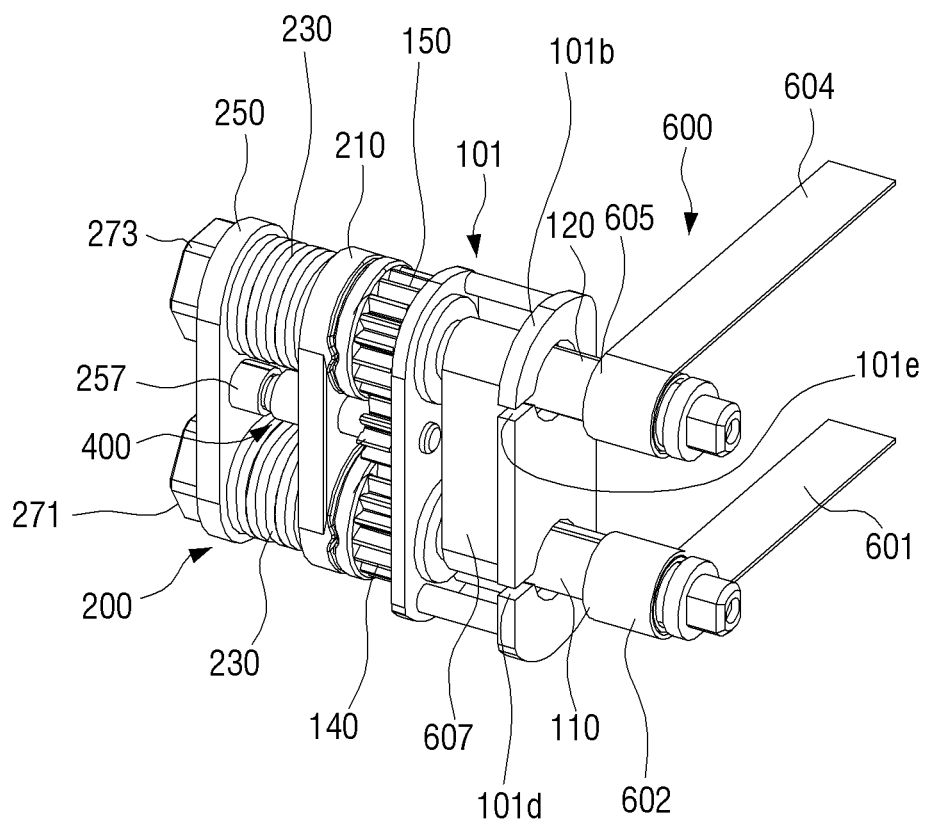
FIG. 11 is a perspective view illustrating a flexible printed circuit board (FPCB) disposed on first and second driving shafts in the hinge apparatus of FIG. 4.
Figure 12:
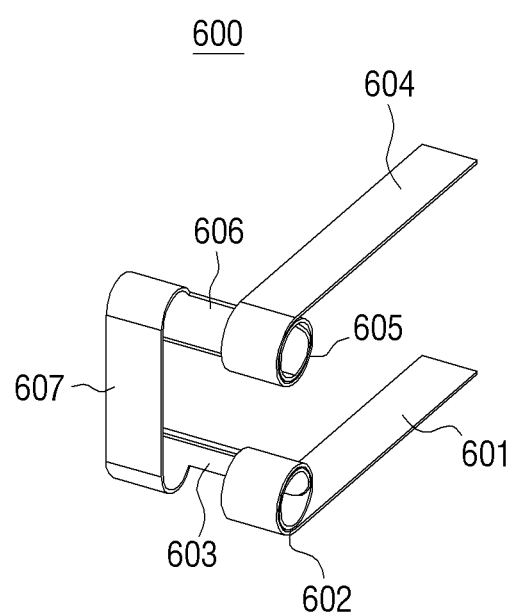
FIG. 12 is a perspective view illustrating the FPCB of FIG. 11.

Referring to FIGS. 11 and 12, the electric connecting unit 600 is disposed within the hinge apparatus 100 to electrically connect the first body 30 and the second body 50 to each other. The electric connecting means 600 may be a flexible printed circuit board (FPCB). The FPCB may be thin and can be restored to its original shape after being deformed.

The electric connecting unit 600 may have portions to be formed in a shape to correspond to the first and the second driving shafts 110 and 120 (or may be formed to enclose the first and the second driving shafts 110 and 120 overall).

The electric connecting unit 600 has opposite ends 601 and 604 electrically connected to access terminals (not illustrated) of the first and the second bodies 30 and 50, respectively. The electric connecting unit 600 includes first and second winding portions 602 and 605 extending from the opposite ends 601 and 604 and wound around the first and the second driving shafts 110 and 120 a plurality of times, for example, first and second extension portions 603 and 606 extending along the first and the second driving shafts 110 and 120 as much as a predetermined length, while enclosing parts of the first and the second driving shafts 110 and 120, and a connection portion 607 connecting the first and the second extension portions 603 and 606 to each other. The electric connecting unit 600 may have conductive lines disposed therein connected to the first and second bodies 30 and 50 and an insulation layer to cover the conductive lines.

Figure 13:
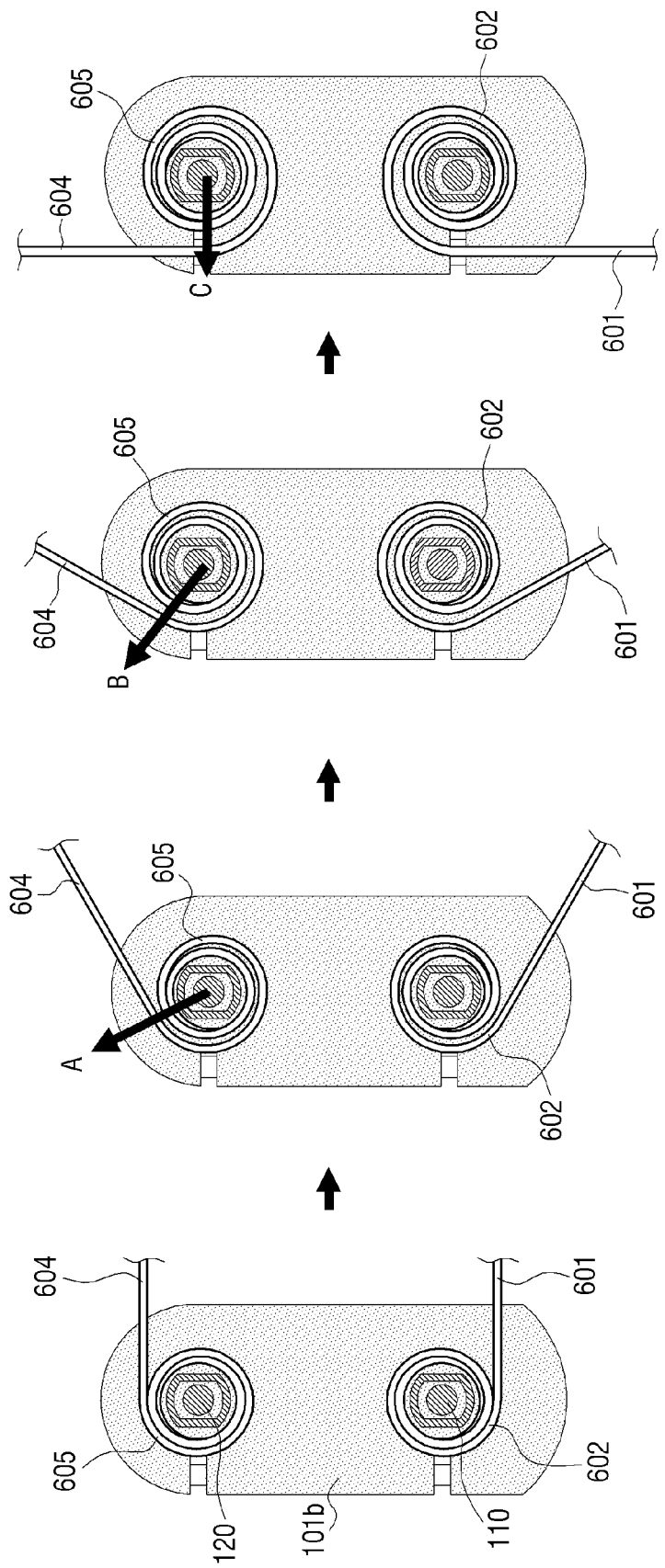
FIG. 13 is a schematic view illustrating a state of winding portions of the FPCB of FIG. 11 according to an angle set between the first and the second bodies.

Referring to FIG. 13, when the first and the second bodies 30 and 50 are rotated from 00 to 180°, the first and the second winding portion 602 and 605 of the electric connecting unit 600 gradually increase their radiuses in directions A, B, and C according to rotation angles thereof. That is, if the rotation angle between the first and the second bodies 30 and 50 increases, the first and the second winding portions 602 and 605 are loosened, and, if the rotation angle decreases, the first and the second winding portions 602 and 605 are restored to their original winding states.

Accordingly, the electric connecting unit 600 has a structure to prevent a problem, for example, a tangle, caused by twisted wire cables when the first and the second bodies 30 and 50 are rotated at 360°, and freely reacts to the rotation of the first and the second bodies 30 and 50, thereby improving durability. Also, the electric connecting unit 600 has a thin thickness and is in close contact with the first and the second driving shafts 110 and 120, so that the electric connecting unit 600 can have a small volume in comparison with the wire cable and is helpful in manufacturing the hinge apparatus 100 with a compact size.

The hinge apparatus 100 according to the exemplary embodiment includes four gears in total including two main gears, 140 and 150 for example, and two idle gears, 310 and 320 for example. However, the present general inventive concept is not limited thereto. It is possible that the hinge apparatus includes only two main gears as described in an exemplary embodiment below, a mesh force between gears can be improved and thus a back lash phenomenon can be minimized. Since the configuration of this exemplary embodiment is the same as that of the exemplary embodiment of FIGS. 4-13 except for the two gears, the same elements as those of the exemplary embodiment of FIGS. 4-13 are assigned the same reference numerals and a detailed description thereof is omitted. A different configuration will be explained.

Figure 14:
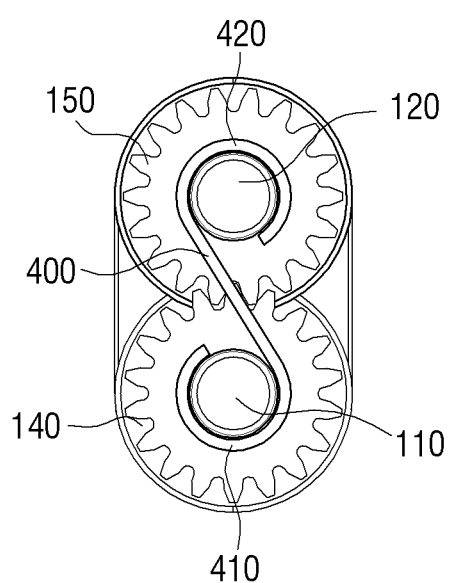
FIG. 14 is a perspective view illustrating a hinge apparatus according to an exemplary embodiment of the present general inventive concept.

Referring to FIG. 14, the first and the second main gears 140 and 150 which are fixed to the first and the second driving shafts 110 and 120, respectively, are tooth-engaged with each other.

The pressure member 400 has opposite ends 410 and 420 slidably connected with the first and the second driving shafts 110 and 120 so that the pressure member 400 presses the first and the second driving shafts 110 and 120 in opposite directions toward each other. In this case, the pressure member 400 may be an S-shaped plate spring as in the first exemplary embodiment.

Figure 15:
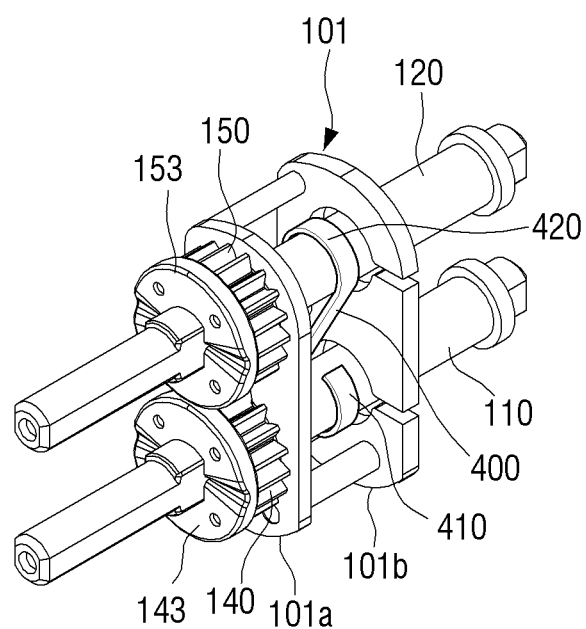
FIG. 15 is a schematic view illustrating an S-shaped plate spring connected to first and second driving shafts of the hinge apparatus of FIG. 14.

Referring to FIG. 15, the pressure member 400 is disposed between the first and second support elements 101*a* and 101*b* of the base frame 101. In this case, the pressure member 400 may be disposed on the first and the second driving shafts 110 and 120 before the electric connecting unit 600 is connected, so as to prevent the electric connecting unit 600 from interfering with the pressure member 400.

As described above, according to an assembly order of the pressure member 400 and the electric connecting unit 600, the electric connecting unit 600 encloses the pressure member 400 while enclosing the first and the second driving shafts 110 and 120. Accordingly, when the first and the second bodies 30 and 50 are rotated, the electric connecting unit 600 is operated in the same way as in the exemplary embodiment described above with reference to FIG. 13. In this exemplary embodiment of FIGS. 14 and 15, the electric connecting unit 600 may be an FPCB that has a thin thickness and can be restored to its original shape after being deformed.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A hinge apparatus comprising:
    a first gear disposed on a first member to rotate according to a rotation of the first member, the first gear including a first shaft;
    a second gear disposed on a second member and tooth-engaged with the first gear to rotate according to a rotation of the second member or a rotation of the first gear, the second gear including a second shaft; and
    a pressure member comprising a spring connected to the first shaft and the second shaft to reinforce a mesh force between the first and the second gears.

2. The hinge apparatus of claim 1, wherein the pressure member reinforces the mesh force by biasing the first and the second gears towards each other.

3. The hinge apparatus of claim 1, wherein the spring comprises a shape to apply a force to the first gear and the second gear so that the first gear and the second gear approach each other.

4. The hinge apparatus of claim 3, wherein the spring comprises an S-shaped plate spring.

5. A hinge apparatus which connects a first member and a second member to each other so that the first member and the second member are mutually foldable, the hinge apparatus comprising:
    a first gear disposed on the first member to rotate according to a rotation of the first member, the first gear including a first shaft;
    a second gear disposed on the second member and tooth-engaged with the first gear to rotate according to at least one of a rotation of the second member and a rotation of the first gear, the second gear including a second shaft;
a pressure member comprising a spring connected to the first shaft and the second shaft to reinforce a mesh force between the first and the second gears; and
an electrical connector, separate from the pressure member, to electrically connect the first member and the second member.

* * * * *

UNITED STATES PATENT AND TRADEMARK OFFICE
CERTIFICATE OF CORRECTION

PATENT NO. : 9,845,625 B2  
APPLICATION NO. : 14/822226  
DATED : December 19, 2017  
INVENTOR(S) : Young-sun Park Page 1 of 1

It is certified that error appears in the above-identified patent and that said Letters Patent is hereby corrected as shown below:

On the Title Page

Item [71] (Applicant), Line 6:  
Delete "Gyeonngi-do" and insert -- Gyeonggi-do --, therefore.

Signed and Sealed this  
Sixth Day of March, 2018

Andrei Iancu  
*Director of the United States Patent and Trademark Office*